(12) United States Patent
Yoo et al.

(10) Patent No.: US 6,771,185 B1
(45) Date of Patent: Aug. 3, 2004

(54) PARKING GUIDANCE AND MANAGEMENT SYSTEM

(76) Inventors: Chul Jin Yoo, 1264 Sumac Trail, Hoffman Estates, IL (US) 60195; Sang Gook Kim, 28 Evergreen Dr., Streamwood, IL (US) 60107; Daniel Yongsuk Pahng, 7416 Kostner Ave., Skokie, IL (US) 60076

( * ) Notice: Subject to any disclaimer, the term of this patent is extended or adjusted under 35 U.S.C. 154(b) by 681 days.

(21) Appl. No.: 09/243,451

(22) Filed: Feb. 3, 1999

(51) Int. Cl.[7] .................................................. G08G 1/14
(52) U.S. Cl. ................... 340/932.2; 340/955; 340/942; 340/539.1; 340/525; 340/958; 701/117; 705/418
(58) Field of Search .............................. 340/932.2, 955, 340/942, 539.1, 525, 958; 705/418; 701/117

(56) References Cited

U.S. PATENT DOCUMENTS

| | | | | | |
|---|---|---|---|---|---|
| 3,376,547 A | * | 4/1968 | Auer, Jr. | .................. | 340/932.2 |
| 5,066,187 A | * | 11/1991 | Hammer | ..................... | 414/237 |
| 5,091,727 A | * | 2/1992 | Mahmood | ................ | 340/932.2 |
| 5,297,252 A | * | 3/1994 | Becker | ........................ | 395/160 |
| 5,432,508 A | * | 7/1995 | Jackson | .................. | 340/932.2 |
| 5,748,107 A | * | 5/1998 | Kersken et al. | ............. | 340/905 |

* cited by examiner

Primary Examiner—Daniel J. Wu
Assistant Examiner—Tai T. Nguyen
(74) Attorney, Agent, or Firm—David I. Roche; Baker & McKenzie

(57) ABSTRACT

A parking guidance and management system. The system provides graphical information regarding the relative availability of parking spaces within a parking garage or other large facility. The system relies on a pair of sensors in each space which combine to provide highly reliable information regarding whether spaces in the facility are occupied or not. The information is gathered by a series of aisle controllers, which communicate with a central computer. The information is displayed at strategically located displays along the way to available spaces. The displays contain advertising messages adjacent to the information about space availability. The information obtained from the sensors at each parking space may be used to provide information to the manager of the facility regarding space utilization. Information regarding the occupancy status of each space may also be used as a check on receipts of parking fees and to identify abandoned vehicles.

7 Claims, 8 Drawing Sheets

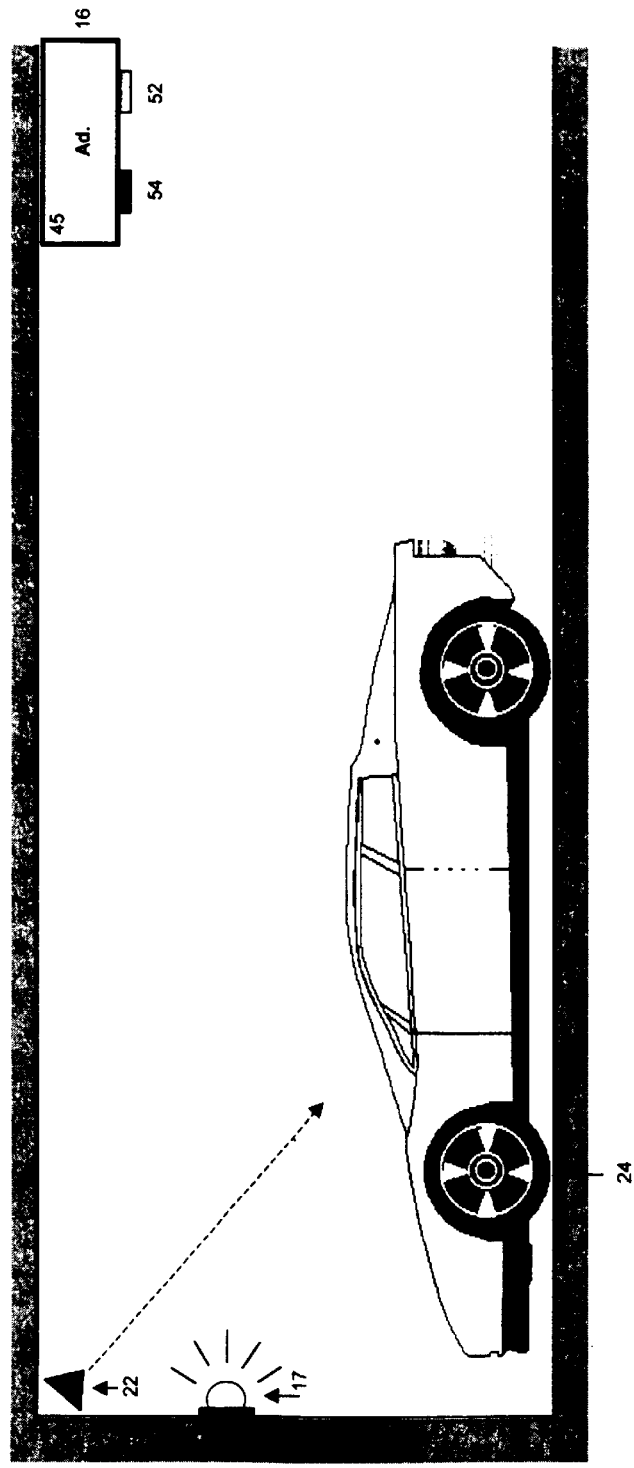
Fig. 2-A

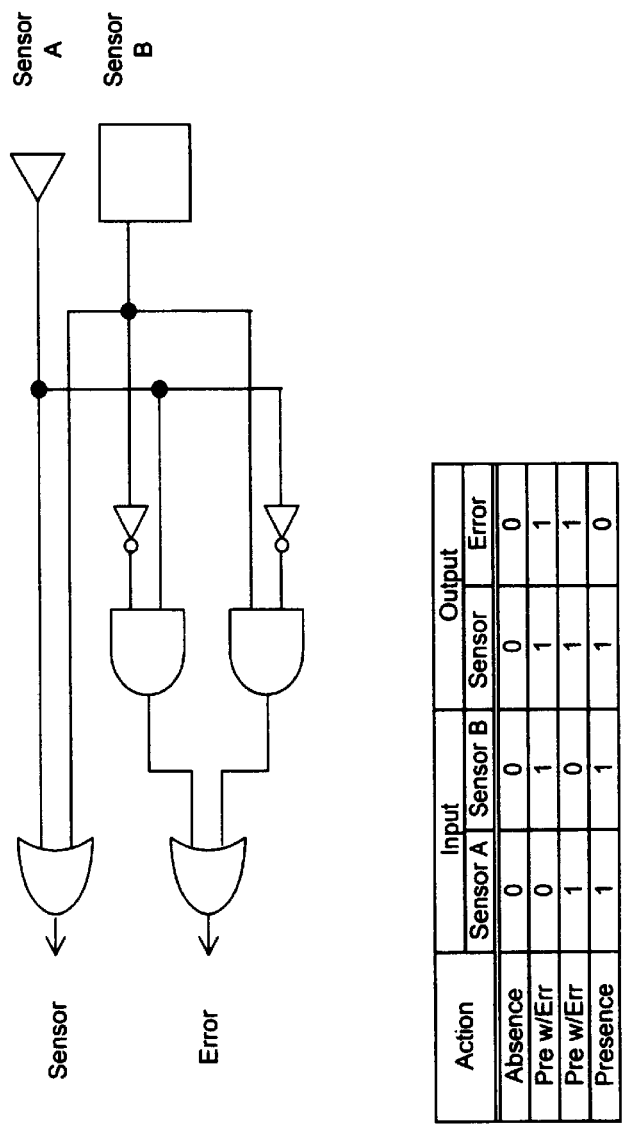
Fig. 5-A

PARKING GUIDANCE AND MANAGEMENT SYSTEM

BACKGROUND AND SUMMARY OF THE INVENTION

The present invention relates generally to large parking facilities such as those found at airports, shopping centers, and densely populated downtown areas. Because of the large number of parking spaces in such facilities, it is not unusual for users of such facilities to have difficulty finding the best available parking space. Difficulty in finding an available space results in waste of time and fuel, and contributes to air pollution in the area near the parking facility. Searching for an available parking space in a crowded self-service garage can be a very frustrating experience for the driver, and the present invention is an effort to eliminate those experiences.

Efforts have been made by others to provide guidance systems for users of large parking facilities. For example, U.S. Pat. No. 2,644,150 shows a system in which sensors are installed at entrance and exit locations, and those sensors count incoming and outgoing vehicles. The counted number of vehicles provides space availability information with respect to each level or section for which there is an entry or exit sensor. The display of information is in a digital form. Other, more recent, efforts include those shown in U.S. Pat. Nos. 5,004,997 (Shisgal et al.); 5,432,508 (Jackson); and 5,504,314 (Farmont). These patents show various techniques for sensing the availability of parking space and displaying information relating thereto. However, it is believed that these systems are lacking in either their reliability, their completeness, or their affordability. The evidence of this is the absence of parking guidance systems from most large parking facilities in existence today.

The present invention has advantages both for the users of parking facilities and for the managers or owners of parking facilities. For users, the present invention includes graphical displays at various locations in the facility to quickly and thoroughly inform the user regarding the location of available parking spaces, so that the user can locate an advantageous and convenient parking spot without wasting time and fuel. For owners or operators of parking facilities, the present invention provides the advantage of advertising, which can generate revenues to offset the cost of installation and operation of the system. In addition, the system of the present invention provides statistical information to the owner/operator regarding space utilization and can assist the operator in identifying abandoned vehicles which have been parked too long at a single location. The system of the present invention further includes a sensing arrangement for detecting the availability of parking spaces which is believed to provide greater reliability as compared to sensing arrangements in the prior art.

BRIEF DESCRIPTION OF THE DRAWINGS

The advantages of the present invention will be better understood by reference to the example disclosed in the accompanying drawings in which:

FIG. 2-A is an enlarged elevational view of a monitored parking space of the present invention;

FIG. 5-A is a logic diagram showing the way in which a pair of sensors in a double-monitored parking space of the present invention operate;

DETAILED DESCRIPTION OF THE INVENTION

Figure 1:
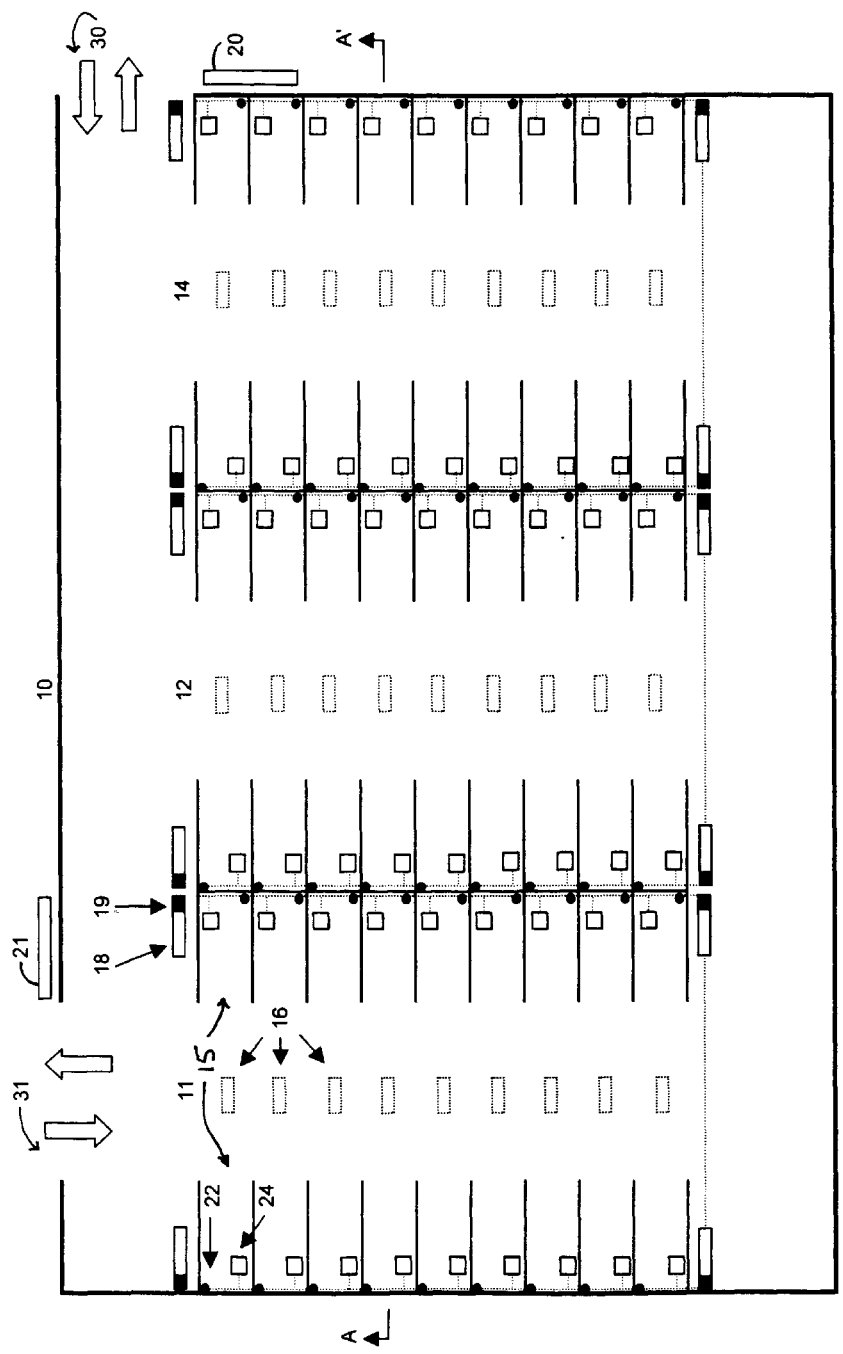
FIG. 1 is a floor plan of a section of a multi-level or multi-sectional parking facility containing three aisles.

FIG. 1 is a plan view of a section of a multi-level or multi-sectional parking lot which has been designed to implement the present invention. FIG. 1 is intended to be exemplary only in that it is one of many arrangements in which the essential elements of the invention described herein may be applicable. In FIG. 1, the section 10 includes a first aisle 11, a second aisle 12 and a third aisle 14. In each aisle, there are a number of parking spaces 15, each of which is monitored by a first sensor 22 and a second sensor 24. The first sensor 22 is an electronic type sensor. Depending on the parking lot situation, the second sensor 24 is either (1) a weight sensitive floor-type sensor, the type where only a very heavy load—on the order of one fourth the weight of a car—will trigger the sensor; or (2) a proximity or magnetic loop type sensor. The use of two sensors at each space, sensors 22 and 24, as one pair, provides reliable verification that a space has been occupied or has become unoccupied, and helps to determine when a sensor is giving a false reading or has stopped working properly.

Figure 2:
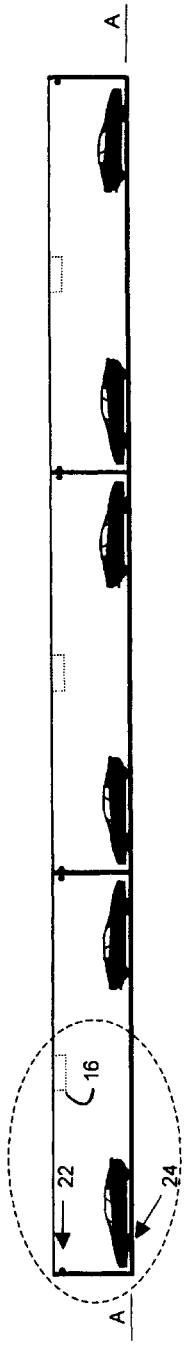
FIG. 2 is an elevational view of the section shown in FIG. 1.

The sensors 22 and 24 associated with a parking space are connected to an aisle controller 19 located within the aisle display 18 for the aisle in which the space is located. The sensors 22 and 24 detect the presence or absence of a vehicle, and that status is noted by the aisle controller 19. If the pair of sensors 22 and 24 generate opposite signals to the same parking space, i.e. one indicates that the space is occupied, and the other indicates vacancy, the system will assume that a parking space is filled and transmit a signal to the aisle controller 19 to indicate that the parking space is occupied. In addition, when the pair of sensors for a particular space generates opposite signals, a warning (audible and/or visual) to both the user and the facility manager will be generated. For example, the warning device 17 adjacent to the parking space shown in FIG. 2A is positioned so that it is readily visible to a driver. The warning device 17 will generate a visible and/or audible warning when one of the pair of sensors in a space detects the presence of a car and the other of the pair of sensors does not detect the presence of a car in that space.

A separate signal, which again may be visual or audible or both, will be sent to the main computer through the aisle controller, so that the manager of the facility will be notified that either a car is wrongly parked, or that a sensor is malfunctioning. One of the advantages of this arrangement is that users who elect deliberately to occupy two parking spaces with one vehicle (presumably to protect their cars from inadvertent impacts from the opening of car doors in adjacent spaces) may be charged an appropriately increased fee.

If repositioning the car results in the pair of sensors for the space both indicating the presence of a car, the warning signal from the warning device 17 will stop. If the problem is due to misalignment of the car in the space, the user may be able to solve the problem by simply re-parking the car so that both sensors correctly indicate that the space is occupied. If the problem is a malfunctioning sensor, a driver will nevertheless be able to see that a space is empty, even though the aisle controller 19 indicates that it is occupied, and the driver can use that space. At the same time, the manager of the facility can act upon the continued warning (i.e., a warning that is not stopped by re-parking) and can repair or replace the non-working sensor. By using two sensors instead of a single sensor, a monitored space is, in effect, double-monitored with one sensor acting as a cross-check upon the other.

The local displays 16 are each associated with a pair of spaces 15 on opposite sides of an aisle. The local displays 16 are connected to the aisle controller 19 so that the local displays 16 can be coordinated to provide an array of green or red lights, depending on whether there is an available space within an aisle. That is, if any one of the spaces within aisle 11 are unoccupied, the series of local displays 16 in aisle 11 will indicate the color green signifying that there is at least one space available in aisle 11. The green lights of the array of local displays 16 in aisle 11 will enable a driver to recognize from some distance that the aisle 11 contains an available space—for example, at the far entrance 30 of the section 20 in the upper right hand corner of FIG. 1. A driver can then immediately by-pass aisles 12 and 14 and proceed directly to aisle 11 for the available space indicated by the array of green lights on the series or line of local displays 16 in the center of aisle 11. Similarly, if all of the spaces in an aisle are occupied, the local displays 16 in such aisle will be turned red to indicate to a driver, at some distance, that the aisle is full.

In the preferred embodiment of the present invention, the entire array of local displays 16 in a given aisle such as aisle 11 will be lighted in unison, with either a green or red display to indicate the availability or unavailability, respectively, of at least one space in the aisle in which the array is centrally located. In an alternative embodiment, the local displays 16 will individually indicate the availability of a parking space immediately adjacent to the single local display. In such alternative embodiment, the local displays may form a combination of red and green indications, depending upon the number of available spaces in a given aisle. In the preferred embodiment, wherein the local displays of a given aisle are coordinated and act in unison to indicate the availability of at least one space in an entire aisle, the aisle controller 19 within the aisle display 18 will be programmed to turn the array of local displays from red to green or from green to red depending upon the status of all of the spaces in the aisle controlled by the aisle controller 19.

It should be noted that the local displays 16 are shown as being attached to the ceiling above the aisle 11. However, in instances where the section of the parking facility does not have a floor above the aisle, such as an open ground-level-only parking facility or the top level of a garage, the local display would necessarily be supported in a different manner, such as by an elevated support near the parking space or spaces with which the local display is associated.

Figure 3:
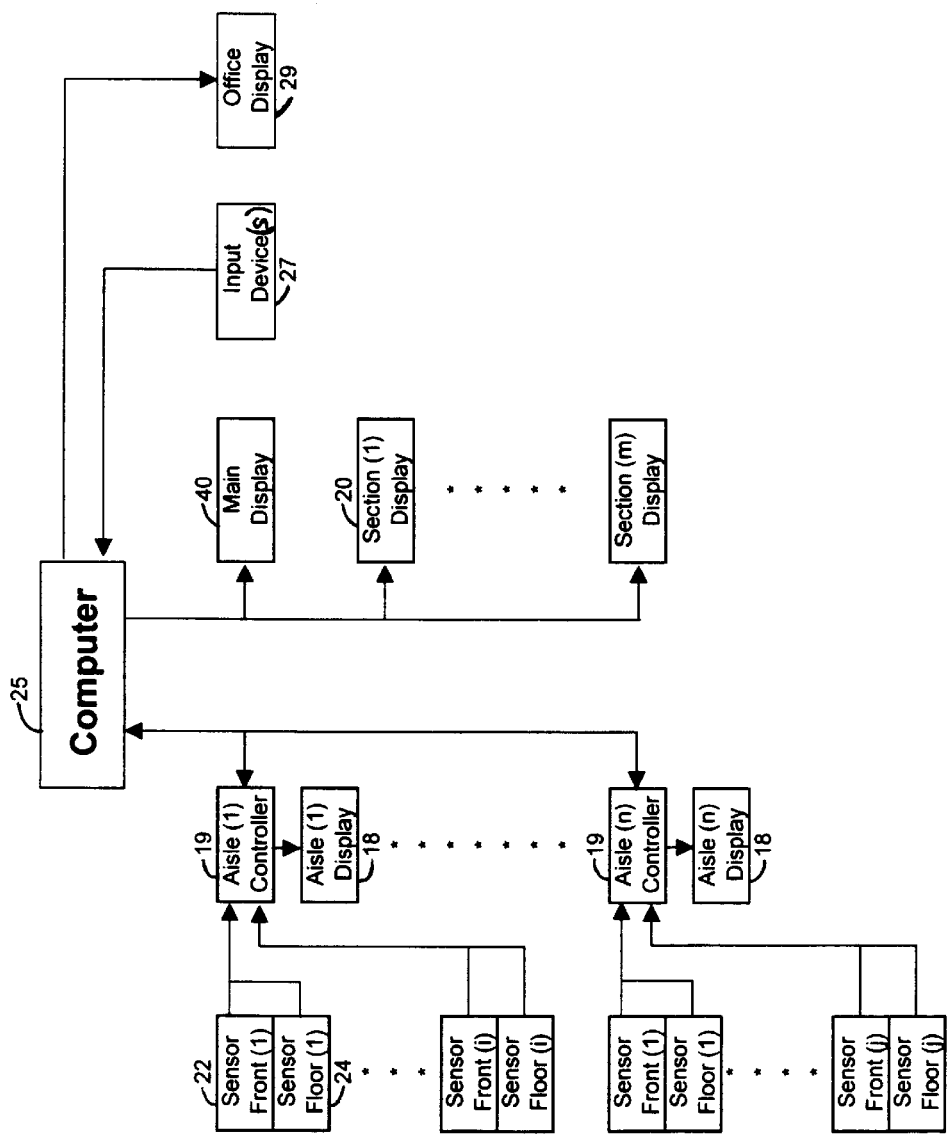
FIG. 3 is a system block diagram of the components of the guidance system of the present invention.

As depicted in FIG. 3, a central computer 25 receives input from various aisle controllers 19 which, in turn, receive input from sensors 22 and 24 which are arranged so that there are two sensors per space. The computer has as outputs a main display which is shown as a single display, but which may be a plurality of main displays depending on the number of main entrances to the facility. In addition to the main display 40, the computer has as output section displays 20, the number of which will correspond to at least the number of sections within the parking facility. Again, however, depending upon the number of entrances to a given section, there may be a need for more than one section display per section, such as the arrangement shown in FIG. 1 wherein entrance 30 has a section display 20, and entrance 31 has a section display 21, and section displays 20 and 21 both relate to and depict the space availability in the section 10. The central computer 25 has as an additional input the main input device 27, which is preferably a keyboard, to allow the operator of the facility to instruct and program the main computer 25. The main computer 25 is also attached to an office display 29 which enables the operator, upon appropriate instructions or keystrokes, to view any of the various displays' video advertising messages.

Figure 4:
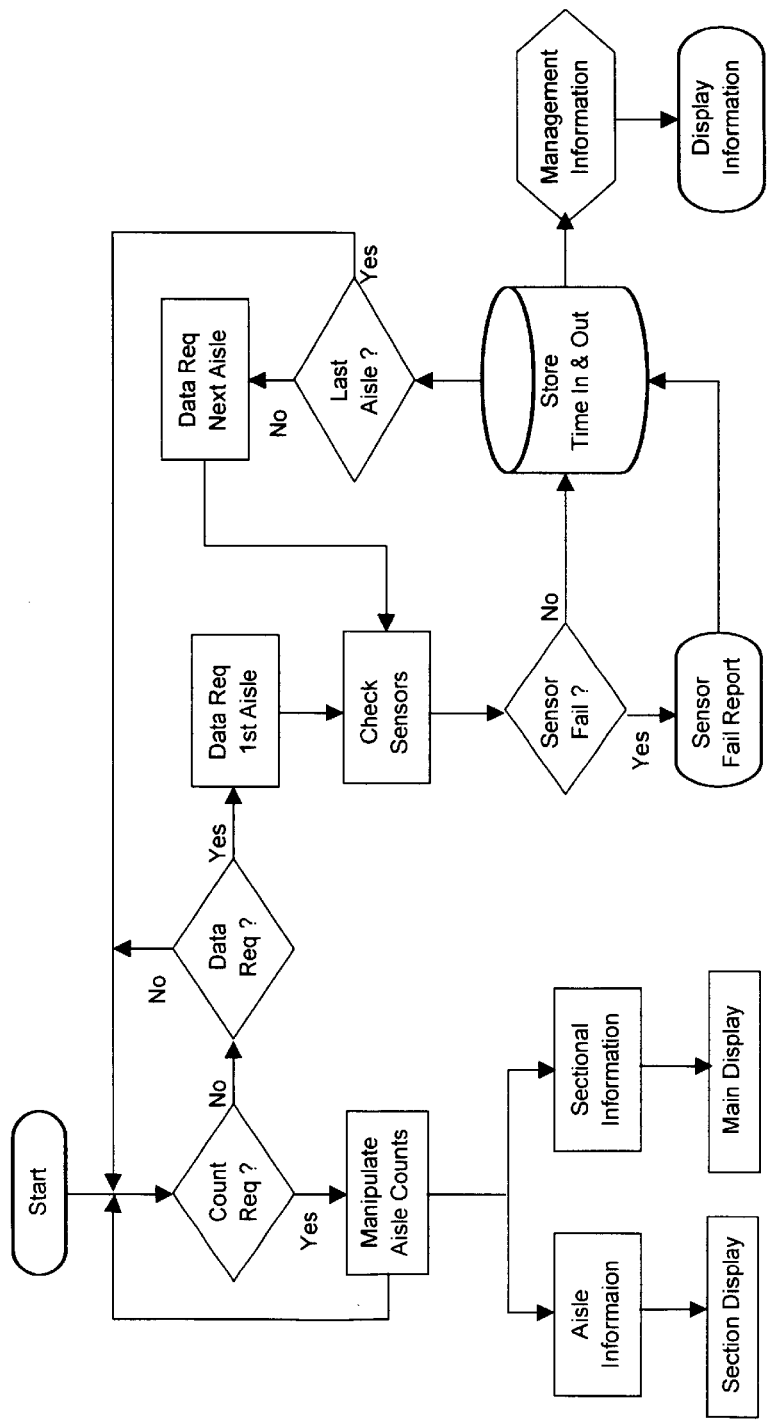
FIG. 4 is a flow-chart showing the functions of the main computer system of the present invention.

FIG. 4 is a flow-chart which depicts in schematic form certain portions of the operation of the guidance system of the present invention. As can be seen from FIG. 4, the main computer first determines whether it is time to perform a count, i.e., a count request. If there is a count request, the system proceeds to count data from the aisle controllers. The aisle count data is then used to create section display information and main display information which can be displayed at one or more locations.

If the system is not performing a count for the section, i.e., is not simply checking for space availability to generate display information and main displays, then the system determines whether it is time to perform a more comprehensive gathering of data relating to time usage of the parking spaces in the facility, i.e., a data request. The gathering of time usage data may be programmed to take place automatically and may be updated at intervals so that the data reflects changes in the occupancy of the spaces in the facility.

The right side of FIG. 4 shows the steps performed in connection with a data request. The system checks each sensor in an aisle, and then checks the sensors of another aisle. That step-wise process continues in a programmed sequence until the sensors in the last aisle are checked. If a pair of sensors at a space are sending opposite signals, a Sensor Fail Report is generated and the time at which the check is made of those sensors is noted in the Sensor Fail Report. A Sensor Fail Report will be issued if an error output signal in being generated pursuant to the logic associated with a pair of sensors, as set forth in FIG. 5-A. The time of a change in status is stored, and may be used to create Management Information. Depending upon the software used to generate reports, a manager may examine the length of time a space is used, and may calculate fees which should have been collected. The manager may also generate Failure Reports. The management information may be displayed and/or printed. Management information may also be used to generate data or reports regarding the length of time for which the monitored spaces have been occupied or the number of times in a particular period the status of monitored spaces has changed from vacant to occupied and back to vacant. Such data may be compared to actual cash receipts for that same period, and could be used, for example, to check the accuracy of such collections, or to determine whether there has been any diversion of funds.

Figure 5:
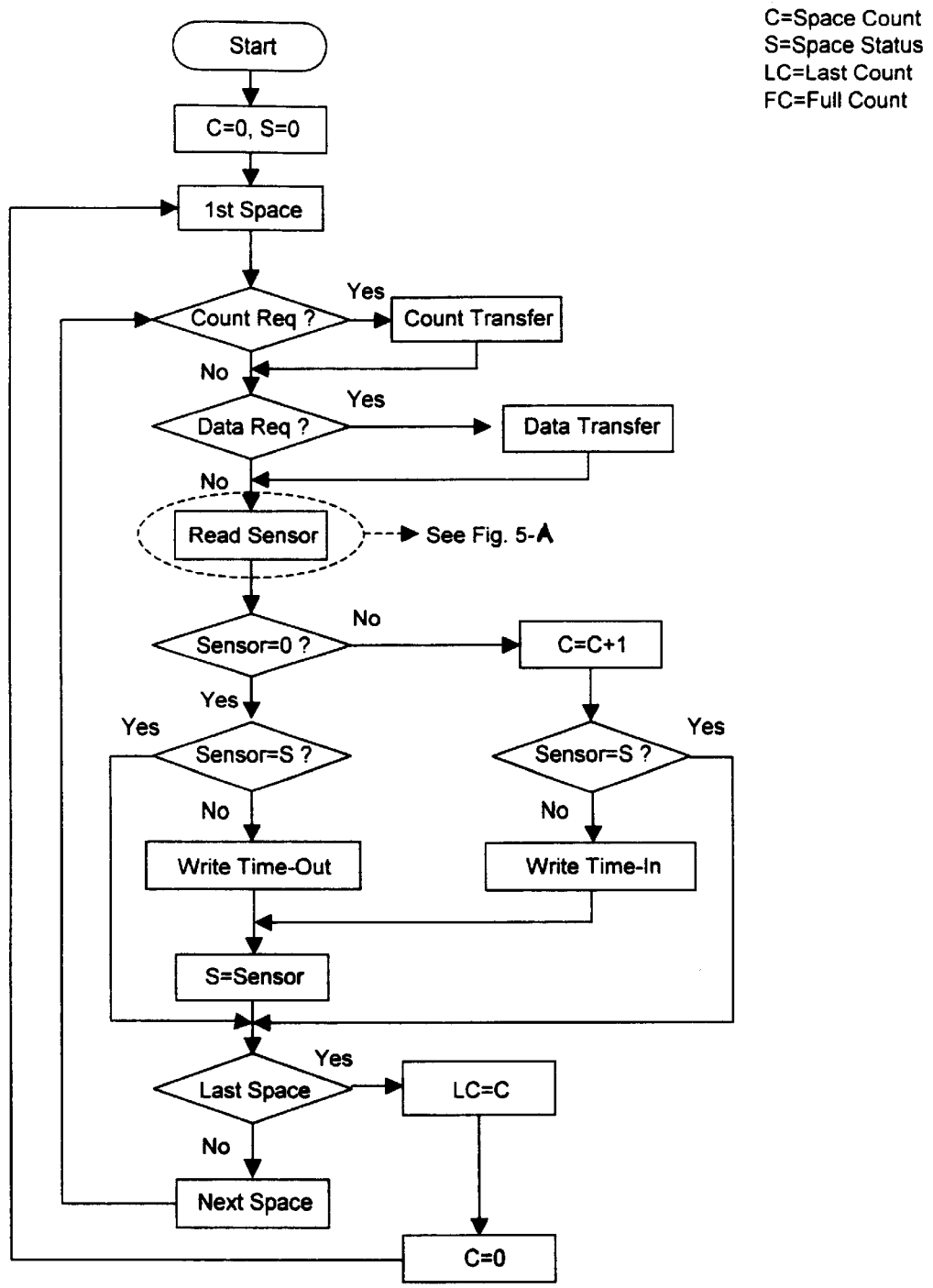
FIG. 5 is a flow-chart showing the functions of an aisle controller of the system of the present invention.

FIG. 5 shows a flow-chart for the interaction between the sensors in a given aisle and a typical aisle controller. As shown in FIG. 5, the aisle controller checks each space for an occupancy (presence) signal. The aisle controller first determines whether the main computer is performing a count or a data request. If not, then the aisle controller reads the first sensor. If the sensor is generating an occupancy signal in the form of a "1", then the count is increased by 1 and the sensor's status is checked to see if there has been a change with respect to the previous status. That is, if the sensor was giving an occupancy (presence) signal in the previous check, no time data is noted. The controller simply checks whether the space checks is the last space, and if not, the next space is checked. If the sensor status has changed, i.e., if the sensor is showing the presence of a car and had not previously shown the presence of a car, the time of entry is stored for that space.

If a sensor is read as vacant (absence of a car) in the form of an "0", then the count is not increased; but, that status is compared to the previous status. If a change from occupied (presence) to vacant (absence) is determined, the time of a vehicle's exit from that space is written into a memory device for that space. If no change in status is detected from a comparison to the previous status, then the space is checked for being the last space, and if the space is not the last space, the next space is checked. The process continues until the last space is checked, at which time, the process is re-started.

FIG. 5A is a logic diagram and signal table which shows how a pair of sensors is used to ensure that correct occupancy information is conveyed to an aisle controller, and that data gathered by the main computer is accurate. As can be seen in the top row of binary data in the signal table of FIG. 5A, both sensors must indicate vacancy (absence) for the output of the pair to indicate vacancy in the form of a "0" output. Similarly, both sensors must indicate occupancy (presence) for the output of the pair to indicate occupancy in the form of a "1" output. If either sensor shows presence while the other shows absence, the space is indicated as occupied (i.e., a "1" output), and an error output is also generated.

FIGS. 6 through 9 show the various exemplary displays contemplated by the present invention. In each instance, the display contains a substantial area 45 for advertisements, which, as discussed above, may be a simple static display such as a poster, or a dynamic display, such as a video, moving or flashing text or other complex display. The advertising area may be a video display based upon a video signal supplied from a peripheral device (e.g., a VCR) connected to the central computer or a cable signal, or the advertising area may be a simple poster which can be changed manually. The advertising areas on the various displays in the system may be a combination of simple (e.g., poster-type) or complex (e.g., video images) displays. In more remote areas of the facility where vandalism may be more likely, it may be preferable to use a less expensive type of advertising, such as a poster, whereas in the main display at a main entrance to the facility, a more expensive and elaborate form of advertising, such as a video, may be preferable.

Since the displays will be the focus of driver attention during a time when the user is attempting to park his or her vehicle, the information regarding space availability on either or both sides of the display is immediately adjacent to an advertising message which can also readily be seen by the individual seeking to park his or her vehicle. It is preferable that the space availability information be in graphical form, such as the bar graphs 42, 43 and 44 (see FIG. 8), or graphs 46, 47 and 48 (see FIG. 9), so that a user can immediately obtain an appreciation for the relative availability of parking spaces within a section or an aisle. Ideally, the data regarding space availability will be in the form of bar graph whereby an incremental increase or decrease in the size of the bar corresponds to an increase or decrease, preferably but not necessarily on a space-by-space basis within the aisle or section for which the display is providing information. For larger areas, such as the bar graphs 46, 47 and 48, which correspond to sections, a proportional display, other than space-by-space, will tell the driver where spaces can most easily be found. Preferably, each element of the bar graph will be lighted by either a green light to show availability or by a red light to show non-availability.

Figure 6:
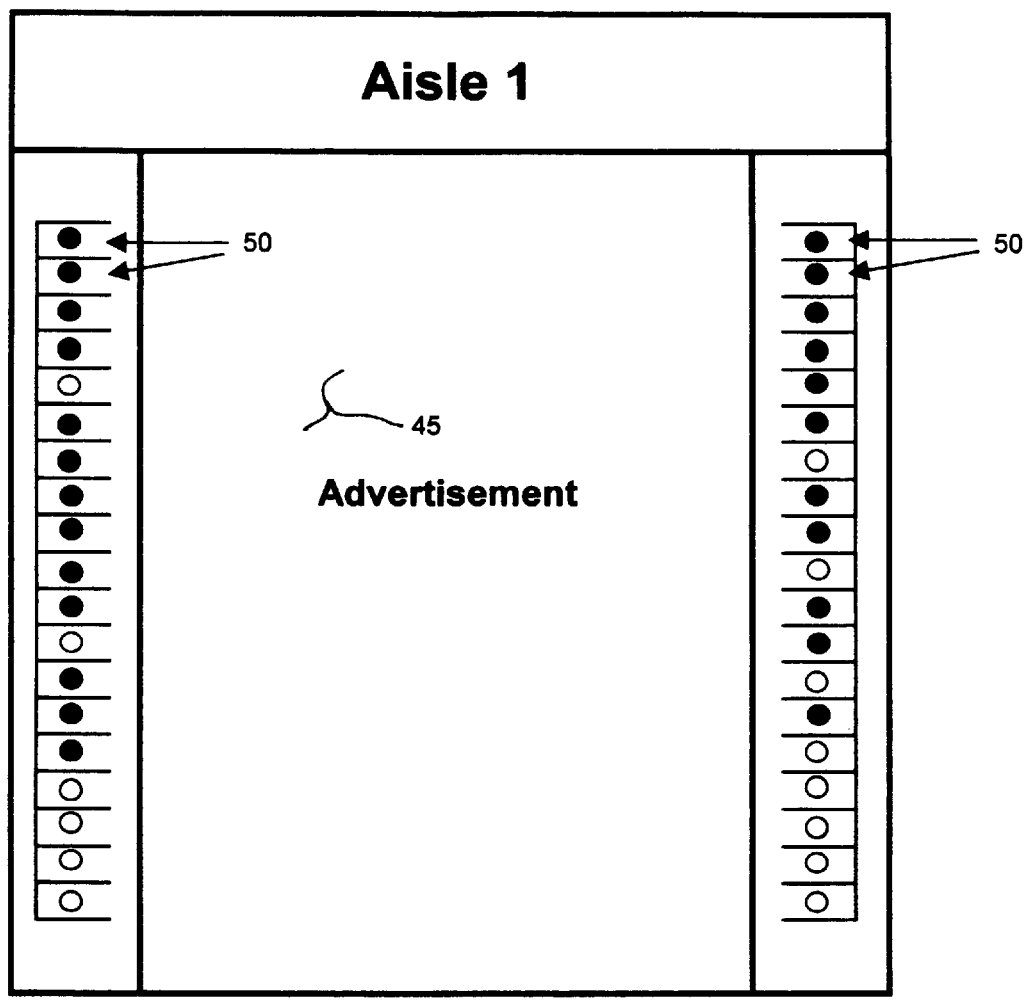
FIG. 6 is an example of an aisle display in accordance with the system of the present invention.
Figure 9:
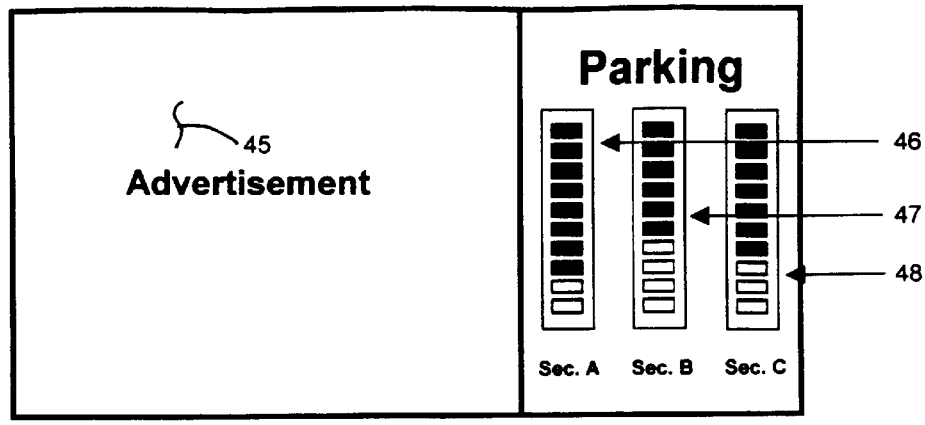
FIG. 9 is an elevational view of a main display in accordance with the system of the present invention.
Figure 8:
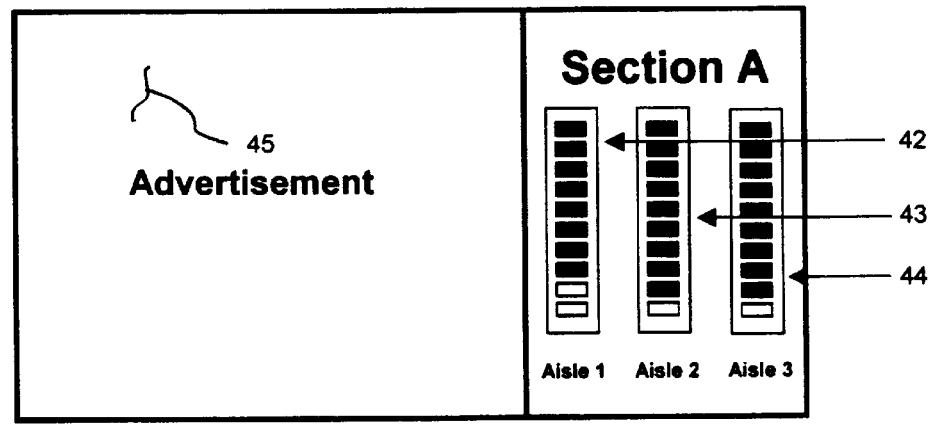
FIG. 8 is an elevational view of a section display in accordance with the system of the present invention.

By providing information regarding space availability in graphical as opposed to digital form, the users need not perform any mental calculations. Rather, the chances of obtaining an available parking space in a particular section or aisle will be immediately known to the user simply by looking at the display. As can be seen in FIG. 6, the preferred form of aisle display will provide specific information regarding the exact location of available spaces within an aisle. FIG. 6 shows a diagrammatic depiction of the aisle for which the aisle display is providing information. The aisle display will indicate by illuminating the appropriate indicator 50 (e.g., green or red) for each parking space within the aisle. Again, the information on the aisle display is graphical in nature rather than digital, so that the information is more readily understood by a driver at the entrance to an aisle. As with the bar graph displays, the indicators 50 are preferably designed so that they will each be either green or red to indicate that a space diagrammatically corresponding to the indicator will be shown as vacant or occupied, respectively.

Figure 7:
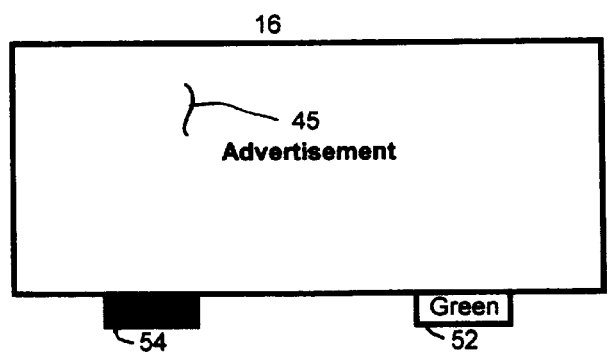
FIG. 7 is an elevational view of a ceiling box light in accordance with the system of the present invention.

FIG. 7 shows the local display 16 with the green light 52 and the red light 54, which preferably hang from the ceiling in the center of an aisle. As discussed above, the lights 52 and 54 of the local displays in an aisle will present uniform arrays or rows of lights of the same color to indicate to a driver some distance away whether an aisle has (green) or does not have (red) any available spaces.

While a specific embodiment of the invention has been shown and described, it will be apparent to those skilled in the art that numerous alternatives, modifications, and variations of the embodiment shown can be made without departing from the spirit and scope of the appended claims.

What is claimed is:

1. A guidance system for a parking facility having a plurality of parking spaces for which the occupancy of at least some of said spaces cannot readily be visually detected by a user at an entrance to said facility, said system comprising:

a plurality of monitored parking spaces equipped with sensors to detect the presence of a vehicle in one of said monitored spaces, a first display at a main entrance to said facility, said first display providing information about the location of available spaces in said facility, said first display showing graphic information regarding availability of monitored spaces throughout said facility, said graphic information including a discrete indication for each monitored space in said facility, said graphic information including both locational information and information regarding relative numbers of available and unavailable monitored spaces in said facility, a plurality of second displays disposed at entries to particular areas of said facility, said second displays providing information about the location of available spaces in said areas, a plurality of third displays disposed at a plurality of locations within said facility, said third displays providing information about the availability of spaces in areas near said third displays at least one of said first, second and third displays is equipped to display advertising in addition to information about parking space availability.

2. A guidance system in accordance with claim 1 wherein:

said third displays are arranged in a light array associated with an aisle in at least one of said sections, said light array being visible to a user from a distance, and said light array indicating that said aisle has at least one available space.

3. A guidance system in accordance with claim 1 wherein:

each of said monitored spaces has at least two sensors which detect the presence or absence of a vehicle.

4. A guidance system in accordance with claim 3 wherein:

said system includes a central computer and display generating controller associated with said second displays, said computer being adapted to receive and store data from said controllers based upon the data signals from said sensors.

5. A guidance system in accordance with claim 4 wherein:

a system information display and input device is connected to said central computer, and said system information display and input device allow a manager of said system to read and output data from said computer.

6. A guidance system in accordance with claim 5 wherein:

said computer includes a timer which together with data from said sensors can create data regarding the usage rate of each monitored parking space in said facility, and usage rates of sections within said facility.

7. A guidance system for a parking facility having a plurality of parking spaces for which the occupancy of at least some of said spaces cannot readily be visually detected by a user at an entrance to said facility, said system comprising:

a plurality of monitored spaces equipped with sensors to detect the presence of vehicle in one of said monitored spaces, a first display at a main entrance to said facility, said first display providing information about the location of available spaces in said facility, a plurality of second displays disposed at entries to particular areas of said facility, said second displays providing information about the location of available spaces in said areas, said second displays showing graphic information regarding availability of monitored spaces in a particular area of said facility, and said graphic information includes a discrete indication for each monitored space an said facility, said graphic information including both locational information for each monitored space within said area and information regarding the relative number of available and unavailable monitored spaces in said area, a plurality of third displays disposed at a plurality locations within said facility, said third displays providing information about the availability of spaces in areas near said third display, at least one of said first, second, and third displays is equipped to display advertising in addition to information about parking spaces availability.

* * * * *